United States Patent
Suau et al.

(10) Patent No.: US 8,575,241 B2
(45) Date of Patent: Nov. 5, 2013

(54) AQUEOUS SOLUTION OF (METH)ACRYLIC FLUID COMB-BRANCHED POLYMERS WITH A SOLID CONTENT GREATER THAN 60%, MANUFACTURING METHOD AND USE AS A PLASTICIZING AGENT

(75) Inventors: Jean-Marc Suau, Lucenay (FR); David Platel, Saint Maurice de Gourdans (FR)

(73) Assignee: Coatex S.A.S., Genay (FR)

( * ) Notice: Subject to any disclaimer, the term of this patent is extended or adjusted under 35 U.S.C. 154(b) by 106 days.

(21) Appl. No.: 13/033,831

(22) Filed: Feb. 24, 2011

(65) Prior Publication Data
US 2011/0207855 A1 Aug. 25, 2011

Related U.S. Application Data

(60) Provisional application No. 61/308,631, filed on Feb. 26, 2010.

(30) Foreign Application Priority Data

Feb. 24, 2010 (FR) ...................................... 10 51302

(51) Int. Cl.
*C04B 24/26* (2006.01)
*C08L 31/00* (2006.01)
*C08K 3/00* (2006.01)

(52) U.S. Cl.
USPC ............................................. 524/5; 524/533

(58) Field of Classification Search
USPC .................................................. 524/5, 533
See application file for complete search history.

(56) References Cited

U.S. PATENT DOCUMENTS

| | | | | |
|---|---|---|---|---|
| 6,034,208 A | * | 3/2000 | McDaniel et al. | 528/403 |
| 6,214,958 B1 | * | 4/2001 | Le-Khac et al. | 526/318.3 |
| 6,756,471 B1 | * | 6/2004 | Kroner et al. | 528/271 |
| 2001/0001797 A1 | | 5/2001 | Le-Khac et al. | |

FOREIGN PATENT DOCUMENTS

| | | |
|---|---|---|
| EP | 1 041 053 | 10/2000 |
| EP | 1 218 427 B1 | 10/2005 |
| JP | 6-321596 | 11/1994 |

OTHER PUBLICATIONS

International Search Report issued Apr. 21, 2011 in PCT/IB2011/000107 (with English translation of Category of cited documents).
Office Action issued Jul. 3, 2013, in European counterpart Patent Application No. EP 11710269.9.

\* cited by examiner

*Primary Examiner* — Ling Choi
*Assistant Examiner* — Ronald Grinsted
(74) *Attorney, Agent, or Firm* — Oblon, Spivak, McClelland, Maier & Neustadt, L.L.P.

(57) ABSTRACT

The present invention pertains to an aqueous solution of comb-branched polymers, having a (meth)acrylic skeleton functionalized by side-chains with hydrophilic alcoxy- or hydroxy-polyalkylene glycol functions, said solution remaining stable and workable at dry solids content levels greater than 60% of its weight. The invention also pertains to a method for manufacturing such solutions, as well as their use as a plasticizing agent, and hydraulic binder-based compositions containing them.

17 Claims, No Drawings

ID2021-01-03

AQUEOUS SOLUTION OF (METH)ACRYLIC FLUID COMB-BRANCHED POLYMERS WITH A SOLID CONTENT GREATER THAN 60%, MANUFACTURING METHOD AND USE AS A PLASTICIZING AGENT

REFERENCE TO PRIOR APPLICATIONS

This application claims priority to U.S. provisional application Ser. No. 61/308,631, filed Feb. 26, 2010; and to French patent application 10 51302, filed Feb. 24, 2010, both incorporated herein by reference.

SUMMARY OF THE INVENTION

The present invention pertains to the sector of additives which can be implemented in hydraulic binder-based aqueous formulations, such as cements, concrete, mortars, or suspensions of calcium sulfate intended for manufacturing plaster, for the purpose of improving their workability. The most effective of these agents are currently comb-structure polymers, which have a (meth) acrylic skeleton functionalized by side-chains with hydrophilic alcoxy- or hydroxy-polyalkylene glycol functions.

The corresponding products currently available on the market are of two types: in the form of a solid powder, though in this case they exhibit the disadvantages of a powder (dangerousness, powdered nature, low workability and particularly pumpability), or in the form of a stable and workable liquid, but one whose active solids content does not exceed 60%. However, the present invention discloses an original method for synthesizing these polymers, which may lead to a product whose solid content is greater than 80% of its weight, while maintaining its liquidity, meaning that it is perfectly workable and particularly pumpable.

This technical advantage is particularly established by a comparison, the solids content being equal, between the Brookfield™ viscosity (at 25° C. and at 10 revolutions per minute) of the inventive products and those of the prior art. As demonstrated by the tests conducted by the inventors, the inventive polymers exhibit a much more fluid nature than those of the prior art, given identical content of active ingredients. Very advantageously, when none of the products of the prior art are liquid at a dry solids content above 60%, the inventive products maintain their fluidity, which makes them perfectly workable. In some cases, maintaining a level of fluidity that is entirely acceptable is even achieved for a dry solids content above 80%, even sometimes above 95%. Furthermore, such products exhibit performance levels that are entirely equivalent to the comb-branched polymers of the prior art.

BACKGROUND OF THE INVENTION

Reducing the quantity of water in formulations containing hydraulic binders, though without altering their fluidity, is essential: this results in doping their mechanical properties. To do so, the person skilled in the prior art has for several years developed additives known as "water-reducing agents", also known by the expressions "plasticizing agents", "plasticizers", and "superplasticizers".

Historically, the first of them were lignosulfonates, as described in the document U.S. Pat. No. 3,772,045. Polycondensates of formaldehyde and naphtalene or melamine sulfonates were then used, as illustrated in the documents U.S. Pat. No. 3,359,225 and U.S. Pat. No. 4,258,790.

Once adsorbed onto the surface of the cement particles, these negatively charged polymers cause an electrostatic repulsion phenomenon, which is the cause of the cement particles' dispersion mechanism; in particular, the document "Superplasticizers for extending workability" (International Conference on superplasticizers and other chemical additives in concrete, Sorrento Italy, Oct. 29-Nov. 1, 2006, supplementary paper, Publ. Malhotra, American Concrete Institute, pp. 263-277) may be consulted.

A new better-performing family of water-reducing agents then appeared: that of carboxylic comb-branched polymers with a skeleton that is generally (meth)acrylic in nature, onto which are grafted side-chains terminated by hydrophilic groups. The molecular weight of these agents varies between about 10,000 and 100,000 g/mol, the molecular weight of the lateral oxyalkylated group being between 1,000 and 10,000 g/mol: in these domains, better-performing agents in terms of plasticizers are obtained.

This improved water-reducing power is explained by the existence of a steric repulsion mechanism relating to the presence of the side-chains, in combination with the electrostatic repulsion phenomenon caused by the anionic carboxylic groups. There are currently 2 types of technologies for accessing these polymers, which respectively lead to an end product in liquid or solid form.

The solid products are powders obtained through adsorption/drying the comb-branched polymer onto the surface of a solid substrates such as a silicon particle (see the document EP 1,636,280), by synthesizing the main chain, drying and then functionalizing it with molten macromonomers (see documents FR 2,900,930 and FR 2,926,558), or simply by drying said comb-branched polymer (see documents EP 1,052,232 and WO 00/17263). Besides the fact that the step of drying is very energy-consuming, the dry and powdered form of these products makes them difficult to work and particularly to transfer from one container to another (by definition, these products cannot be pumped). The products Mighty™ 21 PSN and Melflux™ 1641 F are examples of such polymers sold in the form of powders, respectively by the companies Kao Chemicals™ and BASF™.

Liquid products are obtained by direct copolymerization of monomers in a majority-aqueous environment, according to methods described in the documents JP 08-217505, GB 2,319 522, EP 1,136,507, EP 1,179,517, EP 1,218,427 and EP 1,789,462. Polymers in a solution in water are thereby obtained, whose liquidity is sought to be prioritized. The Applicant is using the term "liquidity" to designate the product's capacity to be workable and particularly pumpable. This ability is directly measurable via the Brookfield™ viscosity value of the obtained polymer solution, measured at 25° C. and at 100 revolutions per minute (Bk 100) for a given solids content (SC) expressed as a % by dry weight of polymer compared to the total weight of said solution. For a given solids content, the product is more liquid the lower this Brookfield™ viscosity value is.

However, the liquid products currently accessible on the market exhibiting solids contents between 25% and 60% particularly include:

Nopco™ SPC-100 (SC=40%, Bk100=400 mPa·s) from the company NOPCO™;

Nopcoflow™ WR-400S (SC=50%, Bk100=300 mPa·s) from the same company;

Nopcoflow™ WR-460 (SC=50%, Bk100=600 mPa·s) from the same company;

the line of products CP-WRM, CP-WB, CP-RS, CP-ST, CP-HR (SC=40%, Bk100<300 mPa·s) from the company LG Chem™;

the Powerflow™ line of products (SC=45%, Bk100=500 mPa·s) from the company KG Chemicals™;

all of these characteristics are given on said products' fact sheets, which are themselves accessible on the corresponding companies' websites.

Additionally, the syntheses of liquid comb-branched polymers described in the literature always imply a quantity of water such that the end solids content of products may not exceed 60% of their total weight. This solids content may be increased artificially by means of formulation additives, such as surface active agents or solvents whose function is to improve the solubility of said comb-branched polymer in water. That said, using such additives constitutes an additional step of fabrication, and complicates the resulting formula. Additionally, some of them (particularly including solvents) constitute dangers for the formulator and the environment. Finally, these additives play no part in the plasticizing power of the end product.

Currently, it is not known how to manufacture comb-branched polymer solutions which are sufficiently liquid to be workable given commercially very advantageous solids content levels, particularly those above 60%, or even 80%, or even 95% of their total weight either without implementing, or while considerably reducing the quantity of, surface active agents or solvents. Reduced quantity refers to a % by mass of solvents or surface active agents less than 5%, more preferably 2%, most preferably 1% of the total weight of the comb-branched polymer formulation.

In view of this, the inventors have now developed the use, in a method for manufacturing an aqueous solution of a (meth)acrylic comb-branched polymer functionalized by side-chains of the alcoxy- or hydroxy-polyalkylene glycol type, and as an agent having the function of improving the fluidity of said solution, of at least one alcoxy- or hydroxy-polyalkylene glycol polymer with the formula (I):

R-(EO)-(PO)-R'         (I)

EO and PO respectively designate ethylene oxide and propylene oxide,

R designates a polymerizable unsaturated function,

R' represents hydrogen or an alkyl group having 1 to 4 carbon atoms, and more preferably hydrogen, said macromonomer being characterized:
in that it exhibits a molecular weight of between 1,000 g/mol and 10,000 g/mol, more preferably between 2,000 and 6,000 g/mol,
and in that the % by mass of the PO group compared to the total mass of the EO and PO groups is between 15% and 95%, more preferably between 20% and 90%, more preferably between 50% and 90%.

Surprisingly, as it was neither disclosed nor suggested in the state of the art, the particular choice of the level of propylene oxide units leads to comb-branched polymer solutions that exhibit improved pumpability and workability compared to the comb-branched polymer solutions of the prior art. In concrete terms, for a given molecular weight of the monomer with formula (I), the full benefit of choosing the propylene oxide level in the aforementioned range is proven.

For significant doses by mass of propylene oxide, and for certain molecular weights of the monomer with formula (I), manufacturing aqueous solutions whose solids content is greater than 95% of their weight can even be achieved, while retaining an entirely acceptable workability (as measured via their Brookfield™ viscosity at 25° C. and 100 revolutions per minute). Furthermore, the plasticizing power of such products is not altered.

DETAILED DESCRIPTION OF THE PREFERRED EMBODIMENTS

A first object of the invention is the use, in a method for manufacturing an aqueous solution of a (meth)acrylic comb-branched polymer functionalized by side-chains of the alcoxy- or hydroxy-polyalkylene glycol type, and as an agent having the function of improving the fluidity of said solution, of at least one alcoxy- or hydroxy-polyalkylene glycol macromonomer with the formula (I):

R-(EO)-(PO)-R'         (I)

EO and PO respectively designate ethylene oxide and propylene oxide,

R designates a polymerizable unsaturated function,

R' represents hydrogen or an alkyl group having 1 to 4 carbon atoms, and more preferably hydrogen, said macromonomer being characterized:
in that it exhibits a molecular weight of between 1,000 g/mol and 10,000 g/mol, more preferably between 2,000 and 6,000 g/mol,
and in that the % by mass of the PO group compared to the total mass of the EO and PO groups is between 15% and 95%, more preferably between 20% and 90%, more preferably between 50% and 90%.

As used herein the EO and PO structures include both to random and block distribution.

This use in a method for manufacturing an aqueous solution of a comb-branched polymer is further characterized in a preferred embodiment that said method implements the reaction between (meth) acrylic acid and at least one monomer with the aforementioned formula (I).

This use in a method for manufacturing an aqueous solution of a comb-branched polymer is further characterized in a preferred embodiment that the aforementioned reaction takes place according to a continuous, batch, or semi-batch method (these methods are particularly illustrated in the document EP 1,218,427).

According to a first variant, the reaction preferably takes place in the presence of less than 40%, more preferably 30%, and most preferably 20%, and extremely more preferably 10% by weight of the water compared to the total weight of the water and polymer.

According to a second variant, the reaction preferably takes place in the presence of more than 60% by water weight compared to the total water and polymer weight, and the reaction is followed by a step of discarding the water in view of obtaining a solids content level greater than 60%, more preferably at least 70%, most preferably at least 80%, and extremely more preferably at least 90% by dry comb-branched polymer weight.

This use is further characterized in a preferred embodiment that the aforementioned reaction implements, as a % by weight of each of the monomers compared to the sum of the masses of the 2 monomers, from 5% to 30%, more preferably from 15% to 25% of (meth)acrylic acid, and from 70% to 90%, more preferably from 75% to 85% of the macromonomer with the formula (I).

This use in a method for manufacturing an aqueous solution of a comb-branched polymer is further characterized in a preferred embodiment that said method comprises a step of adding solvent(s) and/or surface active agent(s) into the aqueous comb-branched polymer solution, the quantity of said solvent(s) and/or surface active agent(s) not exceeding 5%, more preferably not exceeding 2%, and most preferably not exceeding 1% by weight of the said solution's total weight.

This use in a method for manufacturing an aqueous solution of a comb-branched polymer is further characterized in preferred embodiment that said method comprises a step of fully or partially neutralizing the polymer by one or more agents chosen from among ammonium hydroxide or from among calcium or magnesium hydroxides and/or oxides, or from among sodium, potassium, or lithium hydroxides, or from among stearylamine, ethanolamines (mono-, di-, triethanolamine), mono- and diethylamine, cyclohexylamine, methylcyclohexylamine, amino-methyl-propanol, morpholine, and more preferably in that the neutralization agent is sodium hydroxide.

This use of a macromonomer in a method for manufacturing a comb-branched polymer is further characterized in a preferred embodiment that said method comprises a step of separating the polymer into multiple phases, using static or dynamic methods, by one or more polar solvents more preferably belonging to the group made up of water, methanol, ethanol, propanol, isopropanol, butanols, acetone, tetrahydrofurane, and mixtures thereof.

Another object of the present invention is an aqueous solution with a solids content greater than 60%, more preferably greater than 70%, most preferably greater than 80%, and extremely more preferably greater than 90% by dry comb-branched polymer weight, made up of a (meth)acrylic acid and an alcoxy- or hydroxy-polyalkylene glycol macromonomer with the formula (I):

R-(EO)-(PO)-R'                      (I)

EO and PO respectively designate ethylene oxide and propylene oxide,

R designates a polymerizable unsaturated function,

R' represents hydrogen or an alkyl group having 1 to 4 carbon atoms, and more preferably hydrogen, said macromonomer being characterized:
in that it exhibits a molecular weight of between 1,000 g/mol and 10,000 g/mol, more preferably between 2,000 and 6,000 g/mol,
and in that the % by mass of the PO group compared to the total mass of the EO and PO groups is between 15% and 95%, more preferably between 20% and 90%, more preferably between 50% and 90%.

This solution is further characterized in a preferred embodiment in that the polymer that it contains comprises, as a % by weight of each of the monomers compared to the sum of the masses of the 2 monomers, from 5% to 30%, more preferably from 15% to 25% of (meth)acrylic acid, and from 70% to 90%, more preferably from 75% to 85% of the macromonomer with the formula (I).

This solution is further characterized in a preferred embodiment in that it may contain up to 5%, more preferably 2%, and more preferably 1% by weight compared to its total weight, of solvent(s) and/or surface active agents.

This solution is further characterized in a preferred embodiment in that the comb-branched polymer that it contains may be fully or partially neutralized by one or more agents chosen from among ammonium hydroxide or from among calcium or magnesium hydroxides and/or oxides, or from among sodium, potassium, or lithium hydroxides, or from among stearylamine, ethanolamines (mono-, di-, triethanolamine), mono- and diethylamine, cyclohexylamine, methylcyclohexylamine, amino-methyl-propanol, morpholine, and more preferably in that the neutralization agent is sodium hydroxide.

Another object of the invention is the use of the aforementioned aqueous solution of comb-branched polymers, as a plasticizing agent in a hydraulic hinder-based composition.

A final object of the invention is a hydraulic binder-based composition comprising said aforementioned aqueous solution of comb-branched polymers.

EXAMPLES

Example 1

This example illustrates aqueous solutions of comb-branched polymers according to the invention and the art.

In a 1 L glass reactor equipped with mechanical education, a thermal regulation system, and a thermometer, the following is added:

740 grams of a monomer whose molar mass is equal to 3000 g/mole and with the formula (I) in which R is the methacrylate function, R' is hydrogen, the % of ethylene oxide being 70% by an mass compared to the total mass of ethylene oxide and propylene oxide;

70 grams of an aqueous solution of methacrylic acid (90% by mass).

The mixture is heated to 54° C. while being agitated and the following is poured onto the solution:

3.75 grams of DMDO;

A solution made up of 3.2 grams of ammonium persulfate and 6 grams of water.

The medium's temperature gradually rises to 73° C. in 20 minutes.

The medium is cooked for 3 hours at 65° C. and then the whole thing is cooled to 25° C.

This synthesis corresponds to the production of the product according to test #7.

The syntheses of all products according to tests 1, 3 to 14, 15 to 17 are carried out in the same way.

Test #2 corresponds to the commercial product Melflux™ 2500 sold by the company BASF™.

Test #15 corresponds to the commercial product Mighty™ 21 ES sold by the company KAO™.

In table 1, all of the characteristics of the syntheses are indicated, in particular:

the catalytic system used (DMDO=Dimethyldioxirane, AZDN=Azo-bis-isobutyronitrile, PerNH4=ammonium persulfate, with the figures indicating the % by mass of each catalyst, in relation to the total mass of monomers involved);

% AMA designating the % by mass of methacrylic acid;

Mw polymer designating the molecular mass of the manufactured polymer;

Mw mono (I) designating the molecular mass of the monomer with formula (I) being used;

R' mono (I) having the meaning as given in said formula (I);

% PO mono (I) designating the % biomass of propylene oxide in relation to the total mass of ethylene oxide and propylene oxide contained within the monomer with the formula (I).

Table 2 indicates, for each test (IN for the invention and OI for anything not claimed in the invention) the Brookfield™ viscosity value measured at 100 revolutions per minute at 25° C., of each polymer solution, as a function of its cells content which is made to vary by evaporating water (μ50 designating, for example, said viscosity, in mPa·s, corresponding to a solid content of 60% by weight of active ingredient).

It is therefore observed that for a given molecular weight of the monomer whose formula is (I), the particular choice of the level of propylene oxide units as claimed is what leads to the most workable solutions.

TABLE 1

| Test no. | catalyst | % AMA | Mw polymer | Mw mono (I) | R' Mono (I) | % PO Mono (I) |
|---|---|---|---|---|---|---|
| 1 | DMDO-AZDN 1.6-1.1 | 10 | 30,000 | 2,000 | CH3 | 0 |
| 3 | DMDO-AZDN 1.6-1.1 | 10 | 30,000 | 2,000 | CH3 | 30 |
| 4 | DMDO-AZDN 1.6-0.85 | 10 | 60,000 | 3,000 | H | 0 |
| 5 | DMDO-AZDN 1.6-0.85 | 10 | 60,000 | 3,000 | H | 10 |
| 6 | DMDO-AZDN 1.6-0.85 | 10 | 60,000 | 3,000 | H | 20 |
| 7 | DMDO-PerNH4 1.2-0.75 | 12.8 | 60,000 | 3,000 | H | 30 |
| 8 | DMDO-AZDN 1.6-1.1 | 10 | 60,000 | 3,000 | H | 40 |
| 9 | DMDO-AZDN 1.6-1.1 | 12.5 | 60,000 | 3,000 | H | 50 |
| 10 | DMDO-AZDN 1.6-0.85 | 12.5 | 60,000 | 3,000 | H | 70 |
| 11 | DMDO-AZDN 1.6-1.1 | 10 | 80,000 | 4,000 | H | 0 |
| 12 | DMDO-AZDN 1.6-1.1 | 10 | 80,000 | 4,000 | H | 80 |
| 13 | DMDO-AZDN 1.6-1.1 | 12.5 | 80,000 | 4,000 | H | 100 |
| 14 | DMDO-PerNH4 1.6-0.85 | 10 | 30,000 | 5000 | H | 0 |
| 16 | DMDO-PerNH4 1.6-0.85 | 12.5 | 28,000 | 5000 | H | 30 |
| 17 | DMDO-AZDN 1.3-1.1 | 12.5 | 33,000 | 6,000 | H | 30 |
| 18 | DMDO-AZDN 1.3-1.1 | 12.5 | 34,000 | 6,000 | H | 100 |

TABLE 2

| Test no. | OI IN | Mw Mono (I) | % PO Mono (I) | μ 60 | μ 70 | μ 80 | μ 90 | μ 95 | μ 99 |
|---|---|---|---|---|---|---|---|---|---|
| 1 | OI | 2,000 | 0 | 10,000 | solid | solid | solid | solid | solid |
| 2 | OI | 2,000 | 0 | 9,800 | solid | solid | solid | solid | solid |
| 3 | IN | 2,000 | 30 | 1,800 | 10,000 | 15,000 | 25,000 | 45,000 | 65,000 |
| 4 | OI | 3,000 | 0 | 4,500 | solid | solid | solid | solid | solid |
| 5 | OI | 3,000 | 10 | 3,200 | 36,000 | solid | solid | solid | solid |
| 6 | OI | 3,000 | 20 | 2,400 | 32,000 | solid | solid | solid | solid |
| 7 | IN | 3,000 | 30 | 2,100 | 21,000 | 50,000 | solid | solid | solid |
| 8 | IN | 3,000 | 40 | not measured | not measured | not measured | 78,000 | solid | solid |
| 9 | IN | 3,000 | 50 | 2,000 | 4,100 | 17,000 | 69,000 | not measured | 96,000 |
| 10 | IN | 3,000 | 70 | 2,100 | 5,100 | 11,000 | 26,000 | 50,000 | 105000 |
| 11 | OI | 4,000 | 0 | solid | solid | solid | solid | solid | solid |
| 12 | IN | 4,000 | 80 | not measured | 12,000 | not measured | 95,000 | solid | solid |
| 13 | OI | 4,000 | 100 | not measured | solid | solid | solid | solid | solid |
| 14 | OI | 5000 | 0 | 9,800 | solid | solid | solid | solid | solid |
| 15 | OI | 5000 | 0 | 9,600 | solid | solid | solid | solid | solid |
| 16 | IN | 5000 | 30 | 2,400 | 9,200 | 27,000 | 63,000 | 130000 | solid |
| 17 | IN | 6,000 | 30 | 4,500 | 23,000 | 64,000 | 110000 | 152000 | 344000 |
| 18 | OI | 6,000 | 100 | 65,000 | solid | solid | solid | solid | solid |

The above written description of the invention provides a manner and process of making and using it such that any person skilled in this art is enabled to make and use the same, this enablement being provided in particular for the subject matter of the appended claims, which make up a part of the original description.

As used herein, the words "a" and "an" and the like carry the meaning of "one or more."

The phrases "selected from the group consisting of," "chosen from," and the like include mixtures of the specified materials. Terms such as "contain(s)" and the like are open terms meaning 'including at least' unless otherwise specifically noted.

All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A method, comprising:
   combining water, (meth)acrylic acid, and at least one alcoxy- or hydroxy-polyalkylene glycol macromonomer of formula (I):

$$R\text{-}(EO)\text{-}(PO)\text{-}R' \qquad (I)$$

wherein
   EO and PO respectively designate multiple ethylene oxide and propylene oxide units, in random or block distribution, R designates a polymerizable unsaturated function, R' represents hydrogen or an alkyl group having 1 to 4 carbon atoms, and wherein said macromonomer:

exhibits a molecular weight of between 1,000 g/mol and 10,000 g/mol, and has a % by mass of the PO group compared to the total mass of the EO and PO groups of 15%-95%, and causing a reaction between the (meth)acrylic acid and the at least one macromonomer of formula (I) to occur and provide a comb-branched polymer aqueous solution, wherein the reaction takes place in the presence of less than 40% by weight of the water compared to the total weight of the water and polymer.

2. The method according to claim 1, in which the reaction takes place according to a continuous, batch, or semi-batch method.

3. The method according to claim 1, in which the reaction takes place in the presence of less than 30% by weight of the water compared to the total weight of the water and polymer.

4. The method according to claim 1, comprising combining water and, as a % by weight of each compared to the sum of the masses of the two, from 5% to 30% of (meth)acrylic acid and from 70% to 90% of the macromonomer of formula (I).

5. The method according to claim 1, wherein the method further comprises adding solvent(s) and/or surface active agent(s) into the aqueous solution, the quantity of said solvent(s) and/or surface active agent(s) not exceeding 5% by weight of the solution's total weight.

6. The method according to claim 1, wherein the method further comprises fully or partially neutralizing the polymer with one or more agents chosen from ammonium hydroxide or from among calcium or magnesium hydroxides and/or oxides, or from sodium, potassium, or lithium hydroxides, or from stearylamine, ethanolamines (mono-, di-, triethanolamine), mono- and diethylamine, cyclohexylamine, methylcyclohexylamine, amino-methyl-propanol, and morpholine.

7. The method according to claim 1, wherein the method further comprises separating the polymer into multiple phases, using static or dynamic methods, by one or more polar solvents.

8. An aqueous solution having a solids content greater than 60% by dry comb-branched polymer weight, comprising water and a (meth)acrylic comb-branched polymer functionalized by alcoxy- or hydroxy-polyalkylene glycol side-chains comprising, in polymerized form, (meth)acrylic acid and an alcoxy- or hydroxy-polyalkylene glycol macromonomer of formula (I):

R-(EO)-(PO)-R'  (I)

wherein
EO and PO respectively designate multiple ethylene oxide and propylene oxide units, in random or block distribution,
R designates a polymerizable unsaturated function,
R' represents hydrogen or an alkyl group having 1 to 4 carbon atoms,
and wherein said macromonomer:
exhibits a molecular weight of between 1,000 g/mol and 10,000 g/mol, and
has a % by mass of the PO group compared to the total mass of the EO and PO groups of 15%-95%.

9. A solution according to claim 8, wherein the polymer comprises, as a % by weight of each of the (meth)acrylic acid and the macromonomer of formula (I) compared to the sum thereof, from 5% to 30% of (meth)acrylic acid, and from 70% to 90% of the macromonomer of formula (I).

10. A solution according to claim 8, further comprising up to 5% by weight compared to its total weight, of solvent(s) and/or surface active agents.

11. A solution according to claim 8, wherein said polymer is fully or partially neutralized by one or more agents chosen from among ammonium hydroxide or from among calcium or magnesium hydroxides and/or oxides, or from among sodium, potassium, or lithium hydroxides, or from among stearylamine, ethanolamines (mono-, di-, triethanolamine), mono- and diethylamine, cyclohexylamine, methylcyclohexylamine, amino-methyl-propanol, and morpholine.

12. A hydraulic binder-based composition comprising the aqueous solution of claim 8 as a plasticizing agent.

13. The hydraulic binder-based composition according to claim 12 wherein said composition is selected from the group consisting of cements, concrete, mortars, and suspensions of calcium sulfate.

14. The method according to claim 1, in which the reaction takes place in the presence of less than 20% by weight of the water compared to the total weight of the water and polymer.

15. The method according to claim 1, in which the reaction takes place in the presence of less than 10% by weight of the water compared to the total weight of the water and polymer.

16. A method, comprising:
combining water, (meth)acrylic acid, and at least one alcoxy- or hydroxy-polyalkylene glycol macromonomer of formula (I):

R-(EO)-(PO)-R'  (I)

wherein
EO and PO respectively designate multiple ethylene oxide and propylene oxide units, in random or block distribution,
R designates a polymerizable unsaturated function,
R' represents hydrogen or an alkyl group having 1 to 4 carbon atoms,
and wherein said macromonomer:
exhibits a molecular weight of between 1,000 g/mol and 10,000 g/mol, and
has a % by mass of the PO group compared to the total mass of the EO and PO groups of 15%-95%, and
causing a reaction between the (meth)acrylic acid and the at least one macromonomer of formula (I) to occur and provide a comb-branched polymer aqueous solution,
wherein the reaction takes place in the presence of more than 60% by weight of the water compared to the total weight of the water and polymer.

17. The method according to claim 16, wherein the method further comprises reducing the water content after reaction in order to obtain a solids content level greater than 60% by dry comb-branched polymer weight.

* * * * *